(12) United States Patent
Fulton

(10) Patent No.: US 7,125,200 B1
(45) Date of Patent: Oct. 24, 2006

(54) FLOW CONTROL SYSTEM FOR A HOLDING POND

(76) Inventor: Adam S. Fulton, 4116 Susan Ct., Bellingham, WA (US) 98226

(*) Notice: Subject to any disclaimer, the term of this patent is extended or adjusted under 35 U.S.C. 154(b) by 0 days.

(21) Appl. No.: 11/080,264

(22) Filed: Mar. 14, 2005

Related U.S. Application Data

(60) Provisional application No. 60/552,981, filed on Mar. 12, 2004.

(51) Int. Cl.
E02B 3/00 (2006.01)

(52) U.S. Cl. .......................... 405/96; 405/127
(58) Field of Classification Search ................ 405/127, 405/96
See application file for complete search history.

(56) References Cited

U.S. PATENT DOCUMENTS

| | | |
|---|---|---|
| 706,526 A | 8/1902 | Carlisle |
| 930,903 A | 8/1909 | Tucker |
| 3,311,129 A | 3/1967 | Binder |
| 4,015,629 A | 4/1977 | Morgan et al. |
| 4,094,338 A | 6/1978 | Bauer |
| 4,802,592 A | 2/1989 | Wessels |
| 5,133,854 A * | 7/1992 | Horvath ...................... 210/121 |
| 5,498,348 A | 3/1996 | Plink et al. |
| 6,224,753 B1 | 5/2001 | Marbach |
| 6,238,577 B1 | 5/2001 | MacLaren |
| 6,997,644 B1 * | 2/2006 | Fleeger ........................ 405/96 |

* cited by examiner

Primary Examiner—Frederick L. Lagman
(74) Attorney, Agent, or Firm—Michael F. Hughes; Hughes Law Firm, PLLC

(57) ABSTRACT

An apparatus for controlling the fluid flow rate from a drainage pond that is common in developed sites where the drainage pond is adapted to supply a degree of fluid capacitance so the runoff does not overflow downstream creek beds and the like. The method and apparatus for controlling the fluid draining from a pond comprises a system for allowing a higher flow that is allowed by regulatory bodies when the pond is at a lower level so the pond drains more quickly when it is at a lower water level. Thus the apparatus allows for a smaller retention pond.

27 Claims, 11 Drawing Sheets

FLOW CONTROL SYSTEM FOR A HOLDING POND

RELATED APPLICATIONS

This application claims priority benefit of U.S. Ser. No. 60/552,981, filed Mar. 12, 2004.

BACKGROUND OF THE INVENTION

The disclosure relates to a hydrostatic pressure flow control device particularly adapted for an above ground or below ground holding pond (generally referred to as a pond) that is adapted to collect storm water where the flow control device is in fluid communication therewith. The general purpose of the pond is to prevent a large influx of water into a nearby stream or the like which can potentially cause environmental damage. Many regulations require storm water and other runoff water to be directed into a holding pond and then discharged at an adequate flow rate to meet regulated criteria.

In an urban development where forest is removed and is replaced with items such as concrete and the like which have distinctly different runoff characteristics, a detention pond must be implemented for handling storm water. In general, there are two things which must occur with storm water: it must be cleaned, and it must be metered. In one preferred form, there is bioswale that is positioned between a control structure and a main pond volume. In low flows, the bioswale acts as a filtering device, whereby water passes therethrough due to gravitational flow to the control structure. In high flows, the control tower essentially backs up the flow, thereby filling the bioswale and the main large tank. In the control structure there is generally an orifice in the upper portion that is adapted to have the water pass therethrough in a "design H" situation which is essentially a two-year flood, whereby the maximum amount of allotted throughput of water, by the local environmental standards, passes therethrough. Of course, this does not occur until the water level is quite high, and the entire pond is filled up to the upper portions and the maximum capacity thereof.

Generally, state and Federal Departments of Ecology are concerned with fluid throughput between various creek beds and the like, so ecological systems such as salmon eggs are not washed out during a deluge or any form of rain or flood. Essentially, the detention pond is adapted to mimic the pre-developed condition, whereby the dampening effect by the inherent capacitance of all of the forest and under brush. Development such as rooftops, parking lots and other hard surfaces decrease an area's water capacitance. Therefore, the natural flow control is effectively reproduced by the pond and a flow metering device.

It should be noted that there are three essential flow durations (rates over a set period of time) that are allowed: 50% of the two-year flood, 100% of the ten-year flood, and 100% of the hundred-year flood throughputs. These amounts are flow durations, which are measured in cubic feet per second multiplied by number of hours.

Therefore, it is advantageous to have a maximum allowable throughput during the various height conditions of the pond. In one form, this is accomplished by having a fixed hydrostatic head with a known orifice where the head will stay constant regardless of the water level as shown in the detailed description below. In one form, this head is 49% of a two-year amount, which is the maximum allotted through-put amount as per the Department of Ecology standards (at the present time of filing in the Inventor's state of residence which is Washington State).

Therefore, it is extremely advantageous to have a controlled higher throughput of fluid so that the backup of water in the settling pond is a lesser net volume. This allows for a greater amount of real estate to be utilized for other, more usable land or preserved land in the pre-developed state.

The apparatus as described further below functions as an early release mechanism. In the northwest region of the United States, a thirteen-acre developed site would normally require a 41,400 square foot sized pond with prior-art flow control systems in place. With the invention as described below in place, the pond is essentially reduced in topographical square feet by 38%. It should be noted that given the angle of repose of the soil, there is a fixed amount of depth and volume that can occur given a certain square-footage of allotted space for a pond. Additionally, in some embodiments the items are submerged in a concrete box beneath usable soil; however, this is an expensive installation, and of course, reducing the overall size is potentially advantageous.

With regard to the above example that was in use, the implementation of the invention would save approximately $75,000 in estimated costs using the flow control system as claimed.

In the Civil Engineering pond design and installation disciplines, there is psychological trend to guard against the maximum flow and not be concerned with the flow rates that occur immediately leading up thereto. In other words, the prior art is concerned with the maximum flow rates where the damage can occur and not exceeding these flow rates; however, this line of thinking has a tendency to neglect the flow rates immediately preceding and leading up the maximum allowable flow rate. A system as described below provides a maximum allowable flow rate as soon as possible to increase the net volume passing through the pond and the system hence allowing a smaller volume pond to be in place.

SUMMARY OF DISCLOSURE

In one form there is provides a flow control module having an entrance passage that is adapted to communicate with a fluid, where the fluid is in communication with a drainage pond. An orifice is provided at a position in communication with the entrance passage, where the orifice size and height of the water acting thereon provides a hydrostatic pressure acting upon the orifice allows a prescribed fluid flow rate to flow therethrough at a substantially similar rate at a first water level height and second water level height of the drainage pond.

DETAILED DESCRIPTION OF THE PREFERRED EMBODIMENTS

Figure 1:
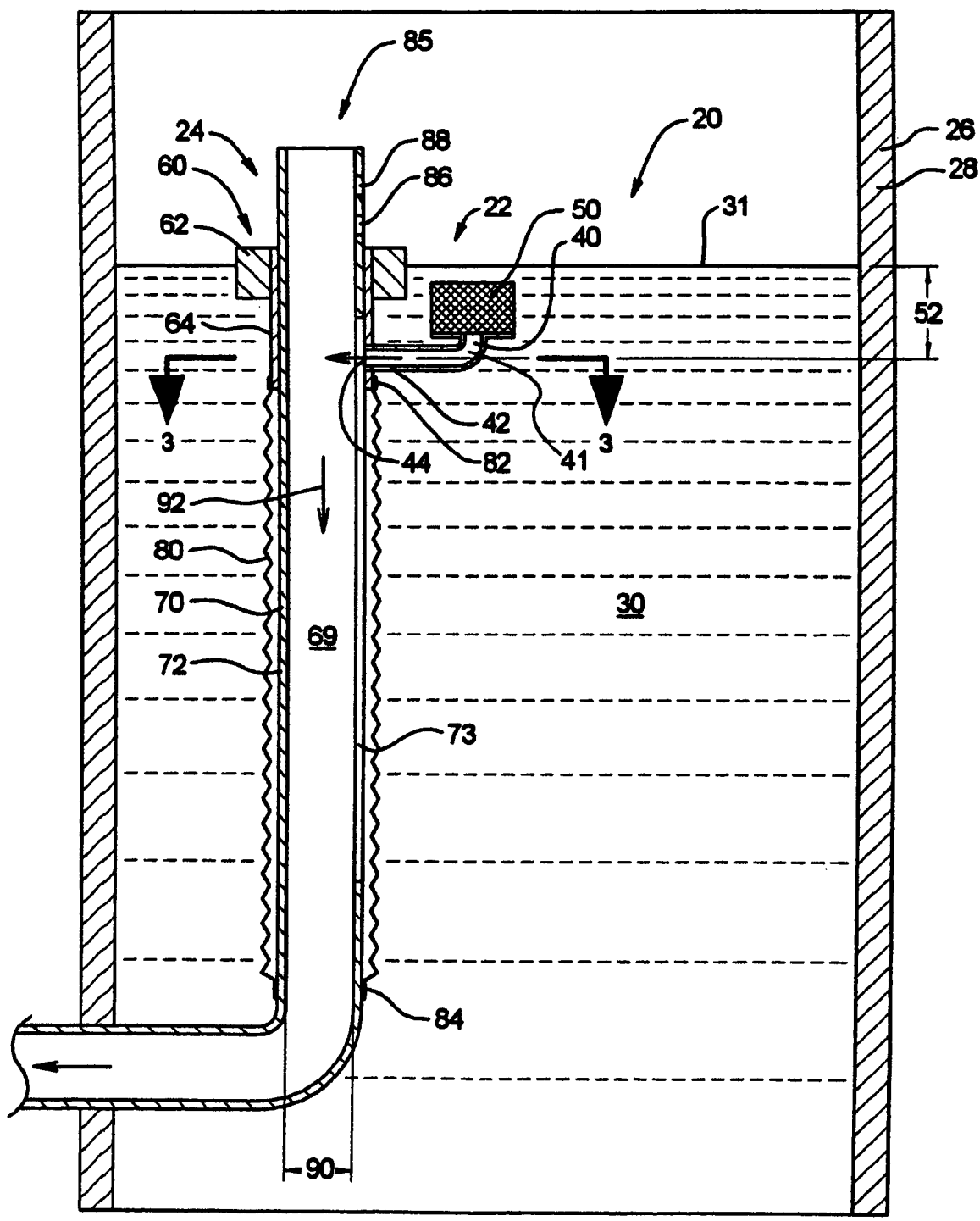
FIG. 1 shows a partial cross-sectional view of an embodiment of a flow control system.

In general, the flow control assembly 20 comprises a control container 28 and a flow control system 21. The flow control system 21 comprises a flow control module 22 and a water receiving assembly 24. The general environment of the flow control system 20 is within a drainage/reservoir pond that has some form of a container 28 adjacent thereto which houses a body of water indicated at 30. The body of water 30 comprises an upper surface portion 31. Of course hydrostatic pressure results at any depth below the upper surface 31. There also is a storm drainage or the like (not shown) that is in communication with the water receiving assembly 24 that is adapted to receive the fluid therefrom. Further, there is a pond where the outlet control structure/container 20 is in communication with the pond which could be quite large up to 3 acre-feet. The volume of the control container is approximately a 48" circle and about 8–16 feet deep which is about several hundred cubic feet. The container 28 also provides a barrier from the pond. In general the flow control assembly 20 allows for an expedient draining of the pond and the submerged water intake (discussed further herein). The control container 28 allows for a natural filter to screen out debris and other floating material or liquids.

Figure 3:
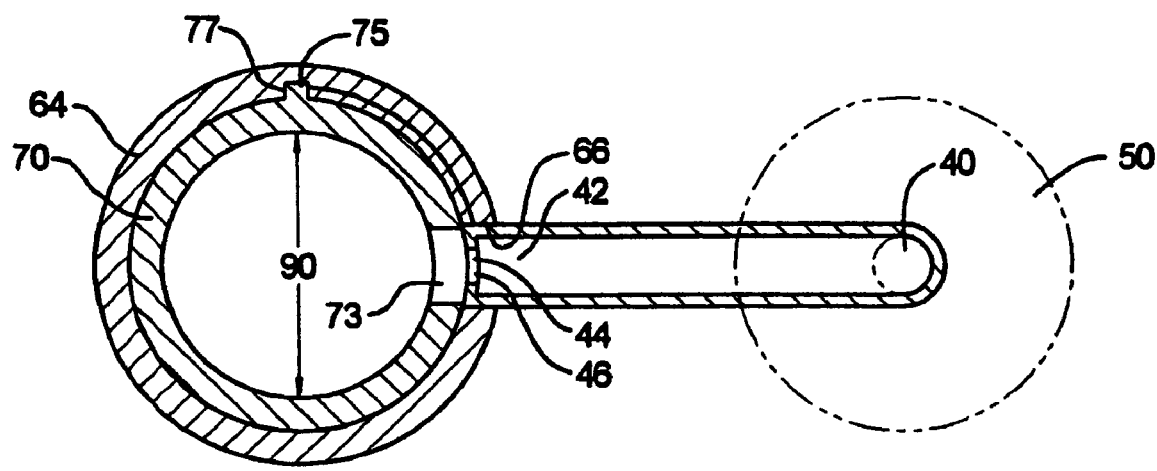
FIG. 3 is a cross-sectional view of the flow control orifice taken at line 3—3 of FIG. 1.

The flow control assembly 20 comprises a flow control system 21 and the control container 28. The flow control system 21 in one form comprises a fluid control module 22 that in general is adapted to in one form maintain a substantially static head pressure with respect to an orifice described further herein. The flow control module 22 comprises an intake portion 40 in communication with a surface defining an interior chamber region 41 and a discharge portion 42 as shown in FIG. 3, the discharge portion has a flow control orifice 44 that has a diameter 46. The diameter 46 corresponds to a cross-sectional area allowing fluid to flow therethrough. In one form this is a circular cross-sectional area; however, other cross-sectional areas can function as well. In one form, the intake portion 40 comprises a filter 50 as shown in FIG. 1 that is adapted to prevent entry of larger debris which can be problematic for clogging the flow control orifice 44 or altering the flow of the water passing therethrough or altering the diameter in various sections of the discharge portion 42.

Figure 2:
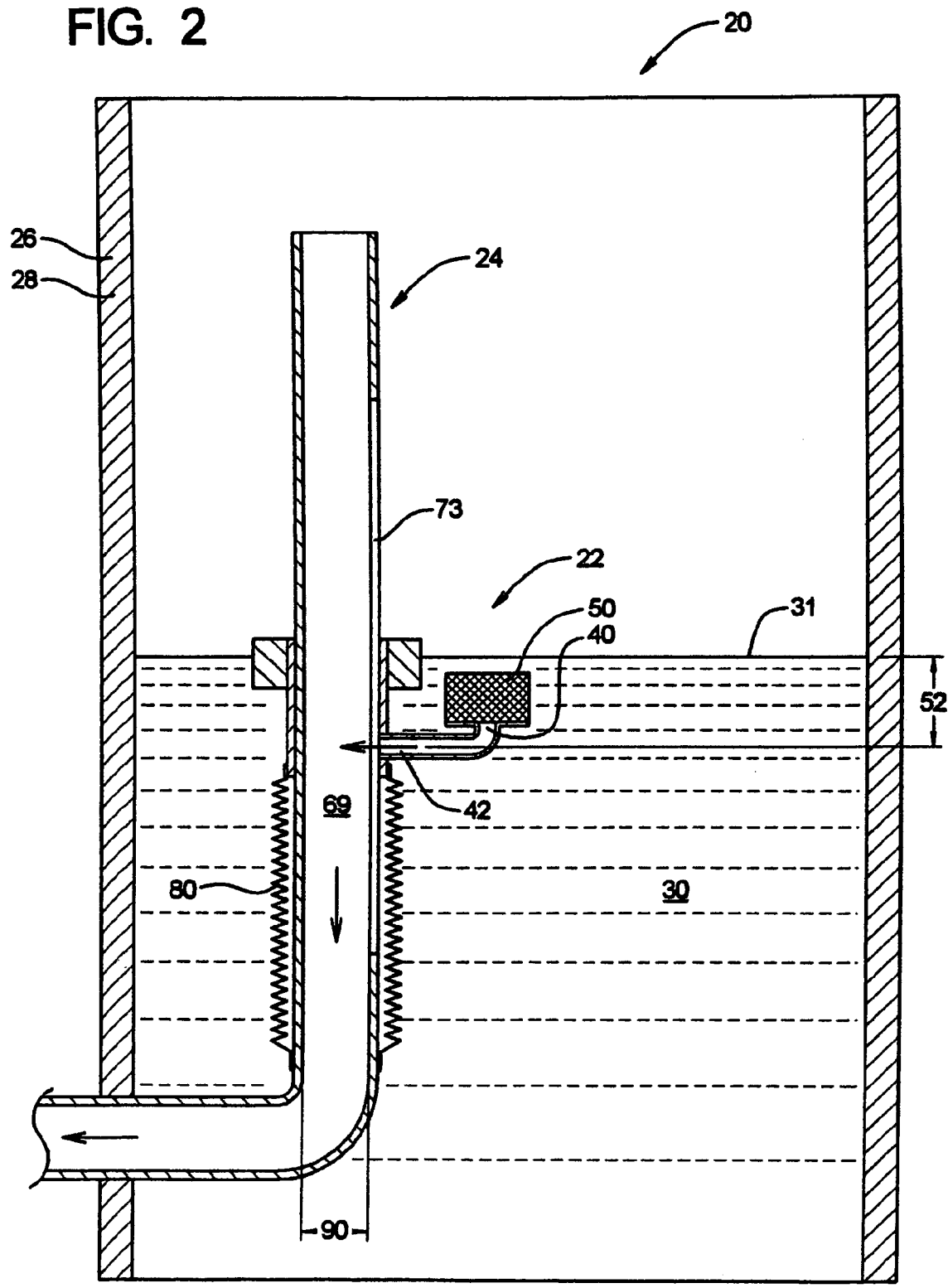
FIG. 2 shows a partial cross-sectional view of a flow control system where the water level is at a lower position in the container.

As shown in FIGS. 1 and 2, from the centerline of the flow control orifice 44 to the top of the surface of the body of water 31 is defined as distance 52. It should be noted that the combination of the set distance 52 and the size of the flow control orifice 44 is such to provide a "maximum allowed flow rate". In general the maximum allowed flow rate is just below the 50% of the two-year flood, in one form 45%–49% of this value or a target goal of 48% of this maximum allowable throughput to proved a certain degree of error in the system to be below the statutory upper limit of 50%. It should be reiterated that in general there are three essential flow rates that are allowed: 50% of the two-year flood, 100% of the ten-year flood, and 100% of the hundred-year flood throughputs. In one form the embodiment would allow flow rates that are with about 5% of the maximum allowed by the controlling authoritative body (e.g. Department of Ecology), and in other forms with in 2% of such maximum allowed flow rates. However, maximum allowed flow rate is defined as any desired flow rate in the jurisdiction where the flow control structure operates.

Referring now to FIG. 1, the flow control module 22 further comprises a buoyancy system 60. In general, the operational aspects of the buoyancy system 60 is to maintain the vertical position of the flow control orifice 44 with respect to the upper surface of the water 31. In one form, as shown in FIG. 1, the buoyancy system comprises a buoyant member 62 and a frame section 64. The frame section 64 as shown in FIGS. 1 and 3 provides a surface having an opening 66 that is adapted to securely mount the discharge portion 42 thereto.

The water receiving component 24 comprises a vertical displacement system 70. In one form, the vertical displacement system comprises a rigid vertical or substantially vertical tube 72 which can be made of a metallic or PVC pipe.

The vertical tube 72 has a central cavity region 69 and a surface defining a passageway 73 that is in communication with the discharge portion 42 of the flow control module (see FIG. 3 for cross sectional view). It should be noted that the flow control orifice 44 need not be positioned directly at the discharge portion 42, but rather and may be in a more preferable form, be positioned anywhere along the tubing sections of the flow control module 22 such as near the screen 50. The important aspect of the flow control module 22 is to provide a substantially constant flow rate in normal conditions whereby the outlet orifice is at 80 certain distance 52 from the water surface 31 and this distance is maintained irrespective of the heights of the water level 31 with respect to the container 28. In the embodiment shown in FIGS. 1–3, the tube 70 has an extension 75 that is adapted to receive the slot region 77 of the frame section 64. This allows for minimal rotation of the frame section 64 which is adapted to position the discharge portion 42 to be aligned and in proper communication with the passageway 73. A further embodiment discussed below alters the orifice size with respect to the heights to control the water fluid rate.

As shown in FIGS. 1–3 the flow control system 24 as previously mentioned comprises the vertical displacement system 70. As shown in FIGS. 1–2 a bellow 80 is provided which allows an accordion like extension and contraction to provide vertical displacement of the flow control module 22. The bellow comprises an upper end 82 and a lower and 84. In one form, the bellow is set at a preset length where the maximum extension of the bellow 80 will only allow the flow control module 22 to extend to a maximum vertical position. The flow control module 22 is attached to the upper end 82 of the bellow 80. As shown in FIG. 1, the flow control module 22 is located at the upper portion of the tube 72. In one form, the flow control module has a maximum upper location which could be similar to the location as shown in FIG. 1 whereby if the water level were to continue to rise, the flow control module will not rise in proportion to the increase of the water level 31 but be held in place by the bellow 80. Thereafter as the water level rises, the water will be exposed to fluid passages 86 and 88. The fluid passages 86 and 88 are one form of a higher flow maintenance system 85. The operation of the higher flow maintenance system 85 is too allow for additional fluid to pass to the drainage (not shown) in more extreme rainfall and water runoff situations which can occur at various times of the year or at peak times in increments of years or decades (and in some cases centuries for a 200 year flood). In general, when the rainfall or water runoff is very excessive, many regulations allow for emergency flows to be in effect whereby the flow rate exiting the water receiving component 24 can be higher than the normal regulated amount.

Therefore, the fluid passages 86 and 88 provide for additional fluid passageways to increase the gross flow rate. Further, because the flow control module 22 is fixed in the vertical direction, the hydrostatic pressure will increase whereby increasing the flow through the flow control orifice 44. Of course any number of fluid passages 86 and 88 can be provided. Alternately, a slot like system which one form is triangular in shape with the pointy portion located at the lower regions can be employed. Further, the upper portion 73 of the tube 72 can be opened or set to a certain diameter to allow additional fluid flow when the water level 31 is extremely high. In some cases where the "200 year flood" occurs a massive amount of throughput is allowed where an extremely heavy rainfall or water runoff is present.

Now referring to FIG. 2, it can be seen that the water level 31 is at a first water level height much lower position then with respect to the second water level height as shown in FIG. 1. This water level within the control structure 28 represents the water level in the adjacent pond. Because the pond has a much larger area, the volume within the pond is considerably lower in FIG. 2 than that as shown in FIG. 1. However, it is apparent that the relative positioning of the water level 31 with the centerline of the discharge portion 42 is substantially the same as that of FIG. 1 if not exactly the same. Of course various minor waves and other such effects will create slight deviations in the hydrostatic pressure that is experienced at the discharge portion 42; however, it can be appreciated that the hydrostatic pressure at the discharge portion 42 is substantially constant irrespective of the water level within the control container 28 and the pond in fluid communication with the control container 28.

Therefore, it can be appreciated that the flow control module 22 in combination with the water receiving component 24 essentially operates as a displaceable unit in the vertical direction (of course with or without the option of lateral displacement which does not affect the operations) whereby in one form a buoyancy system 60 provides the altitude control with respect to the water surface 31.

Now referring to FIG. 2, the flow control system 20 is shown in normal operation. A normal condition is defined where the height of the flow control module 22 is substantially constant with respect to the water level 31. A higher flow condition is defined as discussed above in reference to FIG. 1 where the water level 31 will rise above the set distance indicated at 52 and possibly begin to engage the fluid passages 86 and 88 of the higher flow maintenance system 85. An extreme flow condition is defined where the water level is at a maximum value and a high fluid throughput system such as the opening 73 is employed that allows for a high volumetric fluid flow rate to pass therethrough when the runoff or rainfall or other form of acquiring water is at an extremely high intake rate.

Most of the time the flow control system 20 is operating in the normal flow condition in a manner as shown in FIG. 2. When the water level 31 is at a moderate level, instead of having a lower hydrostatic pressure acting upon an orifice, it can be appreciated that the same hydrostatic pressure as shown in FIG. 1 is the same as the hydrostatic pressure dictating the flow rate as shown in FIG. 2. In other words, the distance 52 is substantially similar. A situation as shown in FIG. 2 occurs where a reasonable rainfall or spring runoff occurs and the container 28 has received a certain influx of fluid. Because the flow control system 22 can pass fluid therethrough at the maximum allowed rate at a lower fluid level and a higher fluid level as shown in FIG. 1, the net volume of the pond can be designed smaller (approximately 10–40 percent smaller) than with a system that does not allow for a constant maximum throughput of water. Further, the flow control assembly 20 helps to drain ponds more quickly which prevents the potential hazard that any body of water presents such as a liability to children or a nesting area for ducks near an airport.

Therefore in operation, as shown in FIG. 2 the water level 31 will continue to drop at a normal maximum rate which is defined as the rate of flow that is allowed or desired depending upon the other circumstances of where the water receiving component is connected (e.g. the connected sewer system may have a desirable influx of fluid rate that is lower than the regulated amount). Therefore, the water level in FIG. 2 will continue to drop at a steady rate until the bellow 80 is sufficiently compressed and the water level essentially runs at or slightly below the intake portion 40

It should be noted that the water receiving component 24 in general has a large inner diameter 90 which correlates to a large cross-sectional area so the water essentially drops when injected to the central cavity region 79 whereby a negative gauge pressure is not created at the discharge portion 42. In other words, the potential energy of the falling water indicated at arrow 92 in FIG. 1 disperses its energy by impacting the lower region of the tube 72 and no suction is incurred whereby lowering the pressure near the discharge portion 42 which would induce a greater fluid throughput therethrough. Further, the upper portion of the tube 70 is vented to atmospheric which further reduces any possibility of creating a relatively lower pressure at the discharge portion 42 than atmospheric pressure. It should be noted that the vertical tube 72 need not be cylindrical but could function as a variety of cross-sectional shapes other than the cross-sectional cylinder as shown in FIG. 3. Therefore, the diameter 90 is really a representation of the relative dimensions of the cross-sectional area between the water receiving component 24 in the flow control orifice 44. As mentioned above, in one form the cross-sectional area of the water receiving component 24 is larger than that of the flow control orifice 44 which is designed to control the flow rate through the control module 22. However, by having a portion of the tube 70 exposed to atmospheric, the cross-sectional open area of the tube 70 need not be as large because the discharge portion 42 is essentially venting to atmospheric pressure.

Figure 4:
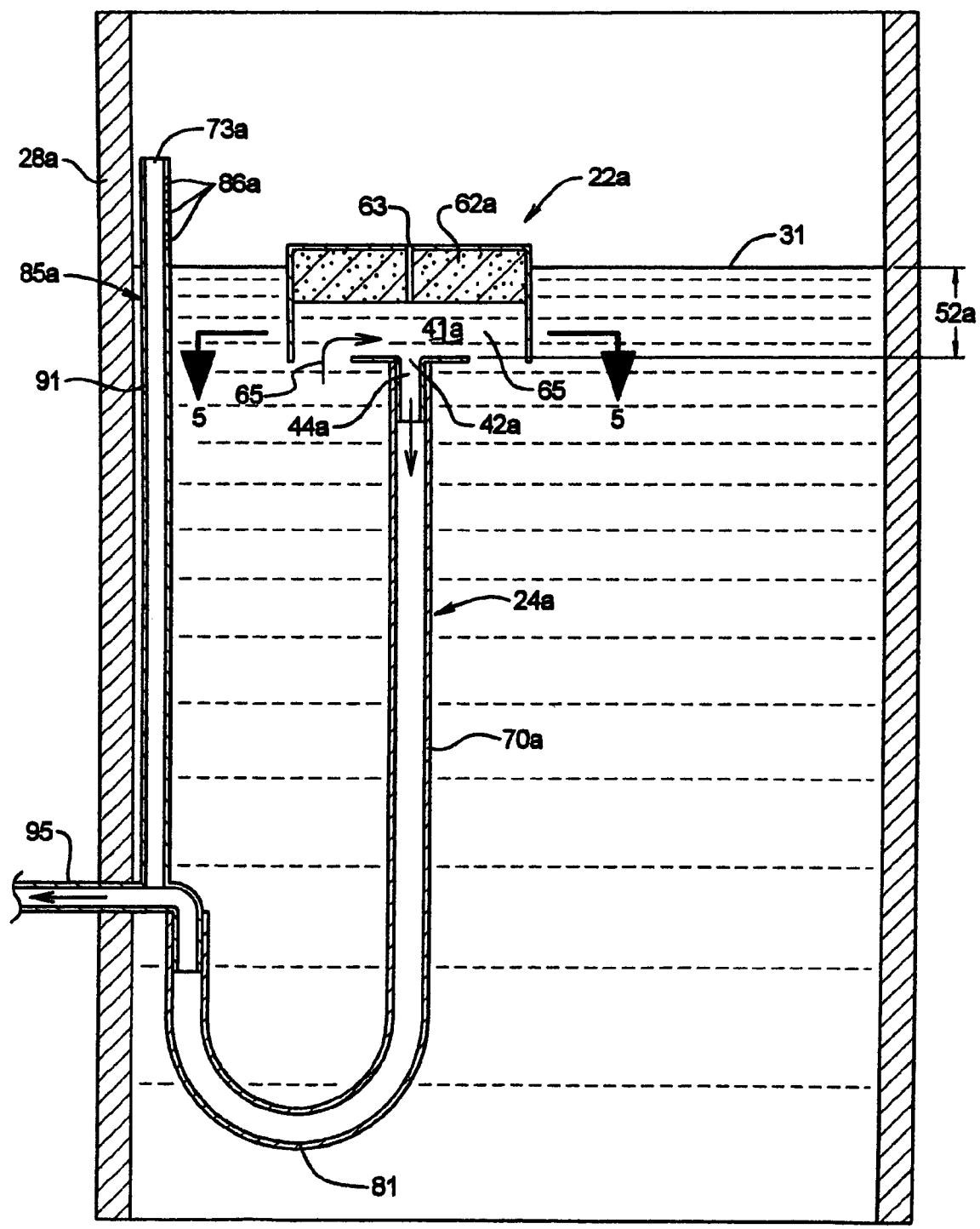
FIG. 4 shows another embodiment of the flow control system.
Figure 5:
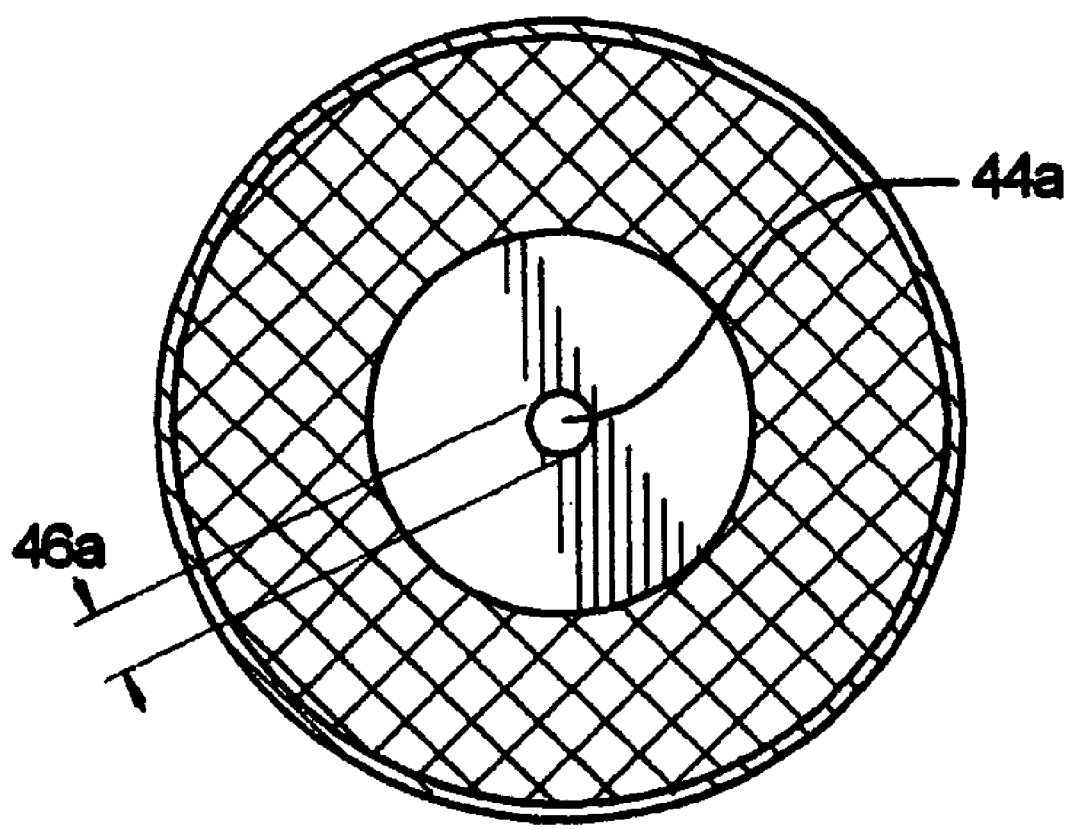
FIG. 5 is a cross-sectional view of the flow control orifice taken at line 5—5 of FIG. 4.

There will now be a discussion of another embodiment with reference to FIGS. 4–5. Similar components will be designated with several numerals except with the alphanumeric character "a" positioned at the end of the numeric reference. As shown in FIG. 4, the flow control module 22a comprises a buoyant member 62a. The buoyant member 62a has a surface defining an opening 63 that allows ventilation to an interior chamber region 65. The flow control module 22a as shown in FIG. 4 has a discharge region 42a which comprises an flow control orifice 44a which is positioned at a strategic location with respect to the water surface level 31 to provide a consistent head pressure. The water receiving component 24a comprises a vertical displacement system 70a which in one form is a flexible tube that is connected to a drainage line 95. In general, the cross-sectional area of the vertical displacement system 70a is sufficiently larger than the flow control orifice 44a so negligible headloss is incurred other than the headloss through the flow control orifice 44a. As shown in FIG. 5, the flow control orifice 44a is shown where the diameter 46a is calculated in conjunction with the distance from the flow control orifice 44a to the height of the water level 31 to produce a normal flow rate described above.

As shown in FIG. 4 the underflow of the water into the central chamber 41a is represented by arrow 65 and prevents the introduction of floating debris or low density fluids such as oil or other hydrocarbon based substances.

It should be noted that the vertical displacement system 70a as shown in FIG. 4 is particularly advantageous in new construction where the lower region indicated at 81 is allowed to sink deeper into the tank region 28a whereby allowing for the flow control module 22a to drop vertically downwardly (and optionally in the horizontal plane if necessary which does not affect the flow operations of the flow control module 22a).

When the flow control orifice is positioned at the area indicated that 42a, the distance to this orifice from the surface 31 is defined as the distance 52a.

As further seen in FIG. 4, a higher flow maintenance system 85a is provided where a plurality of fluid passages 86a are strategically positioned to account for higher flow conditions. In an extreme flow condition an upper orifice indicated at 73a is provided that allows for a greater throughput of fluid along the tube 91. The higher flow maintenance system 85a essentially allows for another fluid passage to directly communicate with the outlet passageway 95.

Figure 6:
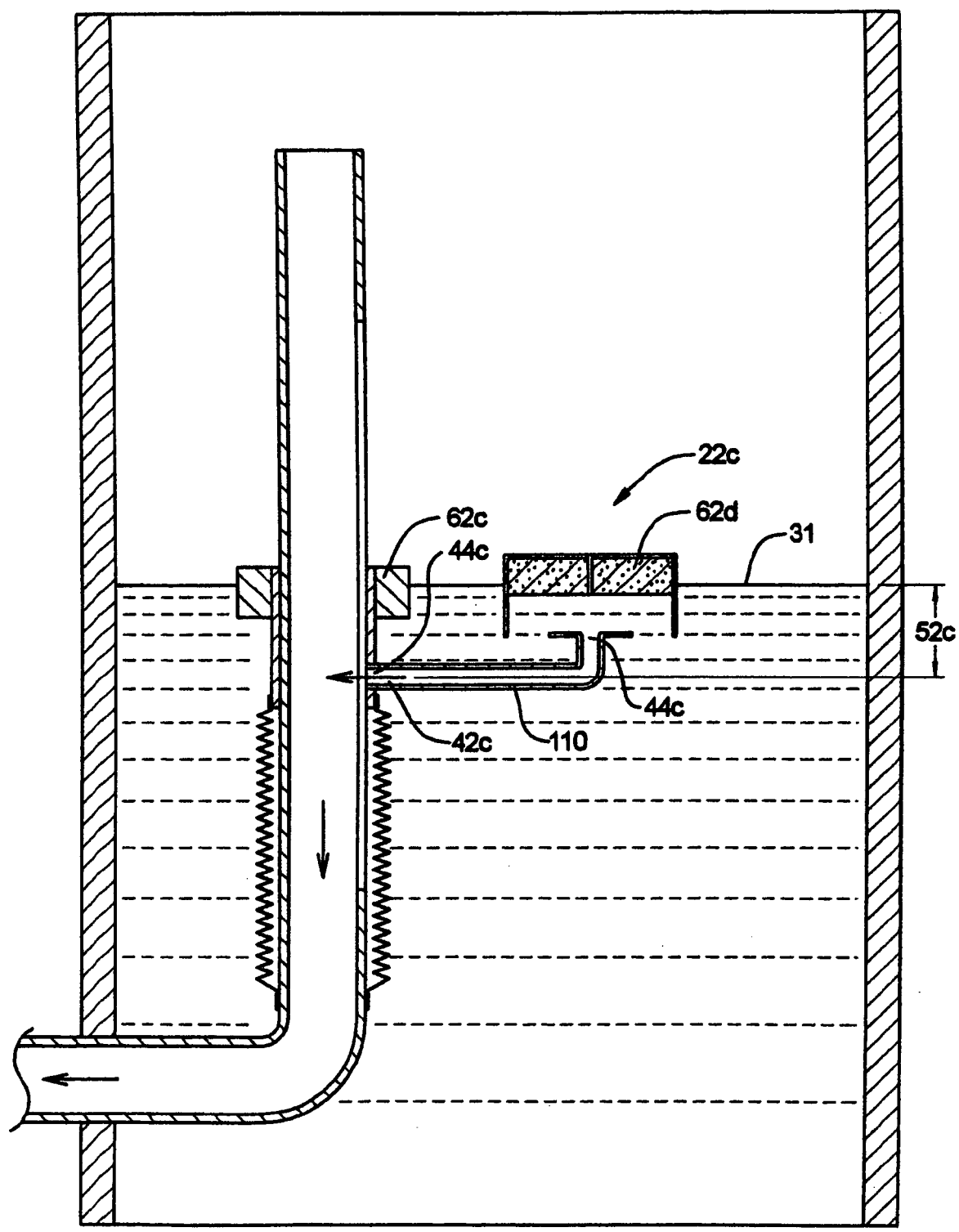
FIG. 6 is another embodiment of a flow control system.

FIG. 6 shows another embodiment which is a quasi combination of the previous two embodiments in general, the flow control module 22c (add to figure) is similar to the flow control module 22a of FIG. 4 where a flexible connection tube 110 is provided. In general, the buoyant member 62c and the buoyant member 62d operate in parallel whereby the previously described outlet orifice can either be positioned with respect to either float 62c or 62d. In other words, in general the flow control orifice 44 which has a inner diameter that essentially controls the flow rate can either be positioned at a fixed location with respect to the float 62d as indicated by 44c or the positioned at the position indicated by 44c'. If the flow control orifice is positioned at the location indicated at 44c' then in essence, the vertical position of this orifice with respect to the float 62c dictates the flow rate where the fluid can freely flow with minimum head through the flexible tube 110. Alternatively, because the floats 62c and 62d are both positioned at the water level and the outlet portion 42c is at atmospheric pressure and at a fixed distance from the water level 31, the flexible tube 110 having an inner cross-sectional area can function as a flow control module where the length of the tube and the inner diameter functions to provide a proper headloss for the designed flow rate to pass therethrough.

Depending upon where the flow control orifice is positioned, the height can be calibrated therefrom for a desired flow rate. For example, if the flow control orifice is positioned at the location indicated at 44c than the height or distance 52b is used to calculate the water flow rate therethrough. If the flow control orifice is positioned at the location indicated that 44c' then the height indicated at 52c is employed for the water flow calculations. It should be noted that the height of the distance between the flow control orifices and the water level is generally about 6 to 12 inches and in one form about 8 inches. Generally the orifice is submerged at least 3 inches for a relatively static head pressure. Of course in the broader scope a wide range of heights can be employed. In some forms where the buoyant members of the various embodiments will fluctuate in height with respects to the water level, it may be advantageous to have a higher water column it from the flow control orifice to the water level where the tolerances for the diameter or open area of the flow control orifice is held very tightly. In other words, where the fluctuation in water height may vary as the buoyant member soaks up with water over time, the other component, the size of the orifice, is measured precisely. In the alternative, if the water level is held to a very tight tolerance with respects to the orifice for all-time no matter what the conditions, the height from the water level to the orifice can be lowered if there are poor tolerances for the size of the orifice.

Figure 7:
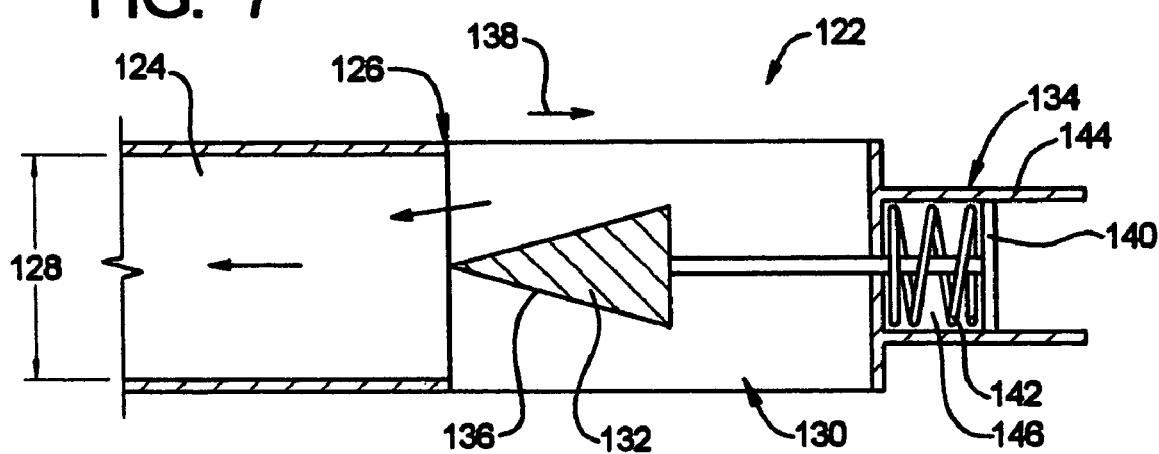
FIG. 7 is another embodiment of the flow control system whereby a cross-sectional area of a passageway varies with respects to hydro-static pressure.
Figure 8:
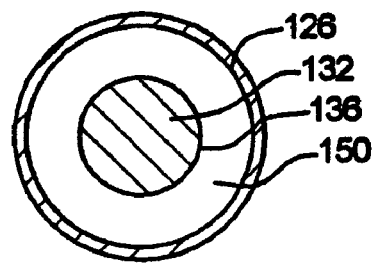
FIG. 8 is a schematic view showing and example of a doughnut cross-sectional area provided to control the water flow.

FIG. 7 shows a schematic view of a flow control system 122 where a fluid receiving portion 124 which is connected to a storm sewage drain or the like at an interface portion 126. The interface portion 126 has a cross-sectional diameter which in one form or the cross-section is tubular, the cross-section is defined by a diameter 128. A flow control valve 130 is provided which comprises a flow control member 132 and a control portion 134. The flow control member 132 comprises a conical or frusto-conical outer surface 136 or any other tapered surface that increases in cross-sectional area with respect to the direction indicated by arrow 138. The control portion 134 has a head receiving member 140 and a biasing member 142. The housing region 144 comprises an inner chamber 146 that is adapted to be at a fixed number of moles of molecules. As the head pressure increases and results in a force upon the head receiving member 140 (where the cross-sectional area of the head receiving member 140 multiplied by the mean pressure acting thereon creates said force) the flow control member 132 is biased toward the interface portion 126 against the force of the biasing member 142. It should be noted that the smallest net cross-sectional area is strategically positioned at the portion where the conical or frusto-conical surface 136 is near the interface portion 126. In other words, as shown in FIG. 8, the central donut shaped region 150 is calculated to dictate the amount of water flow therethrough. As the head pressure increases, the flow control member 32 is inserted deeper into the interface portion 126 whereby decreasing the donut shaped area 150 and substantially maintaining the flow rate. In other words the head pressure goes up and the exposed surface area for water passage goes down. The rate of frusto-conical change of the surface 136 and the spring constant of the biasing member 142 as well as the exposed surface area of the head receiving member 140 are adjusted to allow the proper flow rates in various conditions to remain substantially constant at higher water levels. It should be noted that the surface 136 of the flow control member 132 need not be a linear increase in the conical dimension but could take a variety of forms such as a bullet nose tapered increase whereby as the flow control member is inserted into the interface region 126, the rate of change of the open area 150 as shown in FIG. 8 would decrease whereby allowing greater flow to pass therethrough as the water level reaches the higher levels in the container (not shown in FIGS. 7–8). The apparatus 122 would essentially be positioned at the lower portion of a tank similar to that of tank 28 in FIG. 1 and be calibrated for various water levels. It should be further noted that although FIG. 8 shows circular surfaces, any variety of cross-sectional type surfaces can be employed. The important aspect is to have a changing cross-sectional area 150 with respect to the hydrostatic head pressure which is a function of the water level. Of course maximum flow control elements such as that as shown in FIG. 4 above where a vertically extending tube connected to the water receiving component 24 can be employed to increase the flow throughput in higher flow conditions and extreme flow conditions as defined above.

Now referring to FIGS. 9–12, there is shown a most-preferred embodiment. In general, the control container 28e is constructed in a similar manner as the control container shown in previous figures. As further shown in FIG. 9 there is a flow receptacle 33e. In one form, the flow receptacle 33e already exists within the control container 28e and the flow control system 21e is retrofitted to an existing or already fabricated control unit 28e and flow receptacle 33e. The flow receptacle 33e further comprises a high flow maintenance system 85e having a first fluid passage 86e and a second fluid passage 88e. The fluid passages 86e and 88e operate in the same manner as previously described above with reference to FIG. 1. The flow receptacle 33e further comprises a discharge/drainage line 95 that is in communication with a downstream drainage system such as that which is commonly provided when designing the entire drainage pond system.

Figure 9:
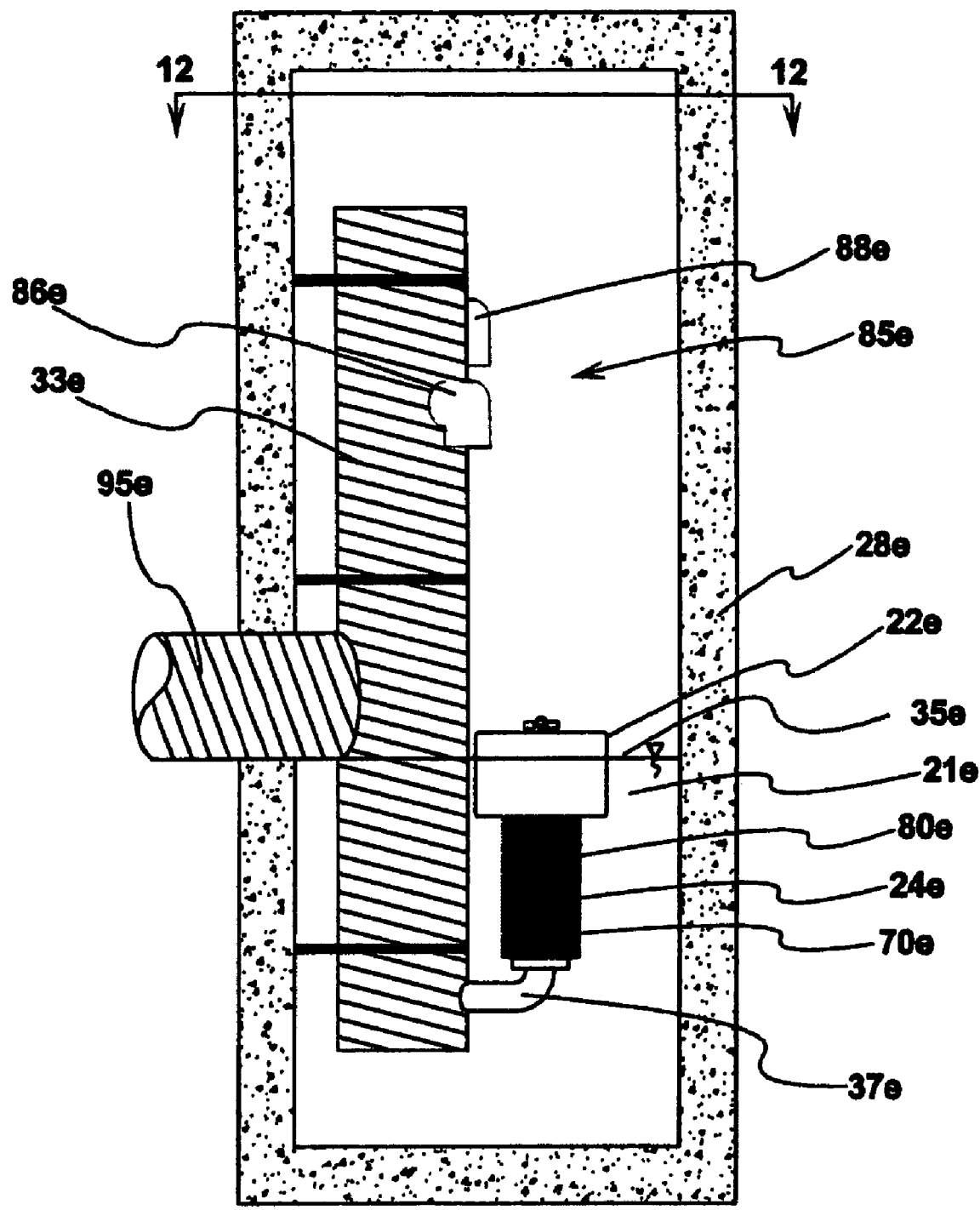
FIG. 9 shows a partial cross-sectional view of a flow control assembly comprising the control container and the flow control system contained therein where the water level is at a low flow state.

Still referring to FIG. 9, the flow control system 21e operates in a similar manner as described above, with slight modifications. The flow control system 21e provides a flow control module 22e and a water receiving component 24e.

Figure 11:
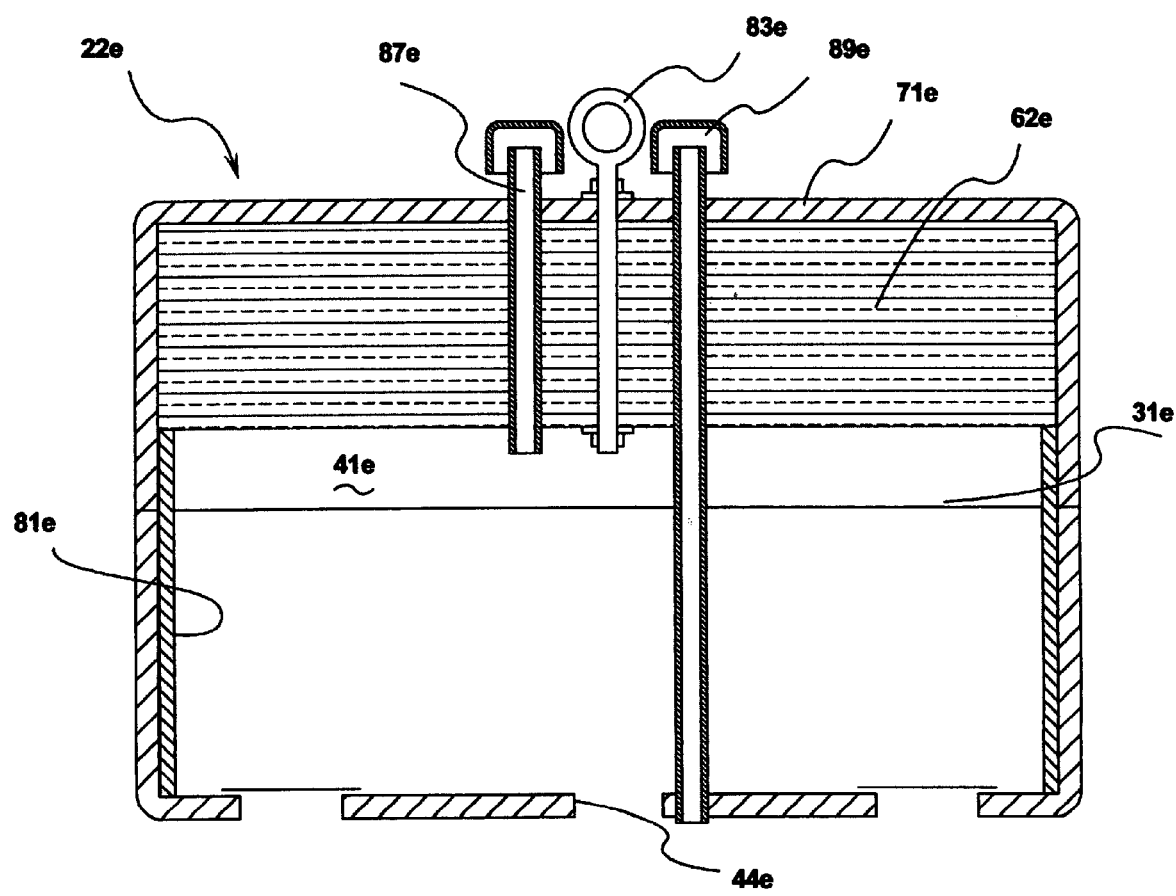
FIG. 11 is a cross-sectional view of the flow control module that is adapted to be fitted to a water receiving component.

As shown in FIG. 11, there is a cross-sectional horizontal view of the flow control module 22e. The flow control module 22e comprises a buoyant member 62e encased within the housing 71e. In general, the buoyant member 62e functions in a similar manner as the buoyant members with similar numerals described above where the main function of the buoyant member is to provide a consistent water level within the chamber 41e described immediately below. The buoyant member 62e can be secured to the upper portion of the housing 71e by means of a fastener 83e. Further, the fastener 83e can be provided with an upper eye member.

Figure 10:
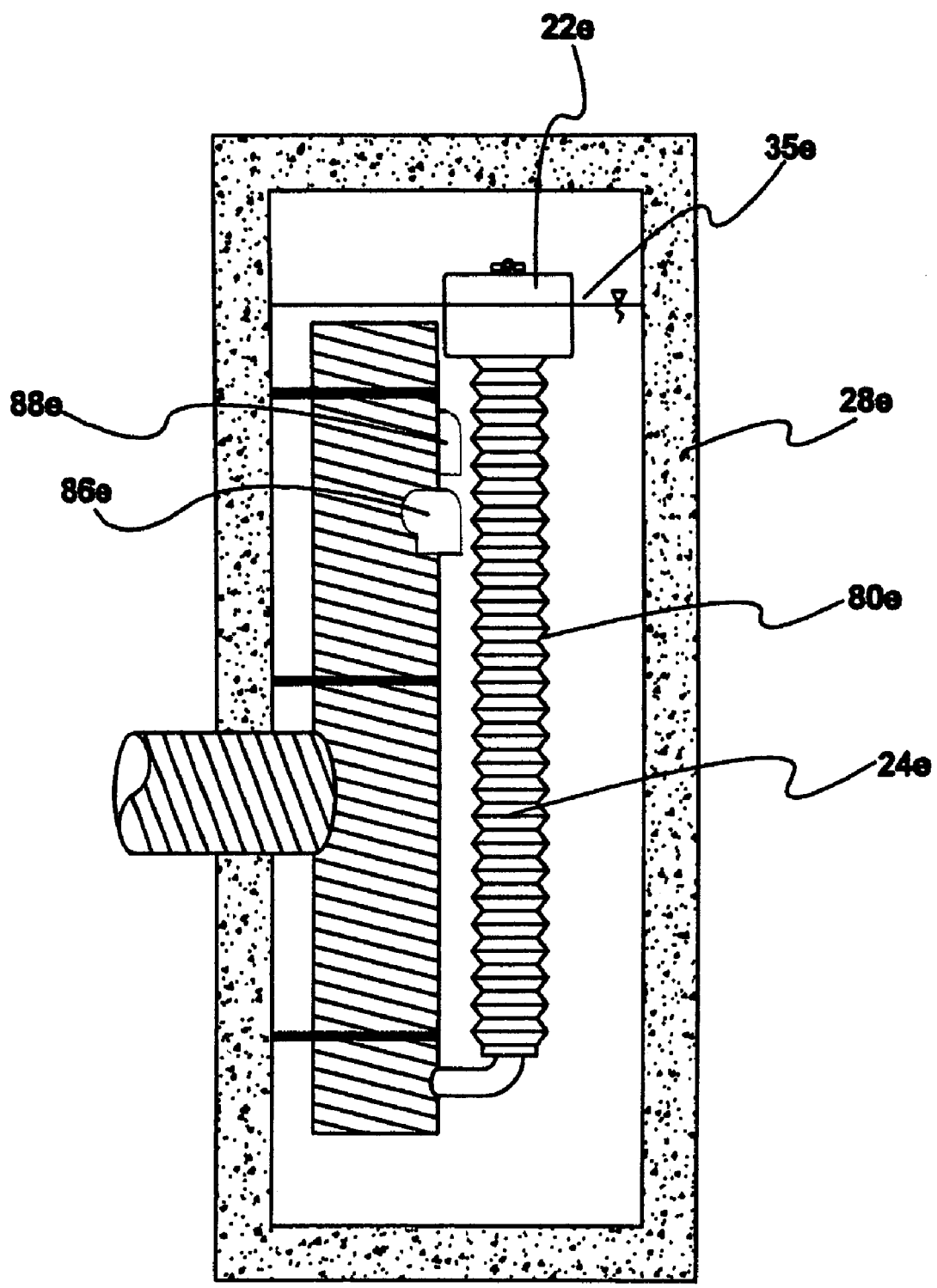
FIG. 10 is a partial cross-sectional view similar to that in FIG. 9 where the water level is at a higher position within the control container.

The housing 71e has an inner surface 81e that is adapted to define an interior chamber region 41e. The interior chamber region is provided with a first vent 87e that allows the pressure within the chamber 41e to be at a consistent level which in this form is atmospheric pressure. The lower portion of the housing 71e is adapted to engage the upper region of the water receiving component 24e which in a preferred form comprises the vertical displacement system 70e which is a bellow member 80e that is best shown in FIG. 10. The bellow member 80e is similar to that as shown in FIG. 1, except the interior tube 70 of FIG. 1 is not provided in the embodiment as shown in FIGS. 9–12. Rather the bellow 80e allows the flow control module 22e to reposition vertically to a variety of heights as shown in FIG. 9 and FIG. 10. The flow control module 22e can reposition laterally a slight amount in this configuration; however, present analysis indicates that the bellow 80e which is the primary operating member of the vertical displacement system 70e tends to fold up upon itself and stack in a manner as shown in FIG. 9 without toppling the flow control module 22e. In a preferred form, the bellow 80e has a diameter that is at least one third of the diameter of the flow control module 22e (and more specifically the housing 71e as shown in FIG. 11). A more preferred range is to have the diameter of the bellow 80e to be approximately one half or greater than the diameter of the flow control module 22e.

The vent 89e as shown in FIG. 11 is adapted to communicate with the interior chamber region of the water receiving component 24e which in this embodiment is the interior chamber defined by the interior surface of the bellow 8e0. In general, as described in more detail above, the flow control is a function of the input and output pressures and entrance and exit regions of an orifice. A simple method of control of the pressure within the interior chamber 41e (the entrance region of the orifice) and the interior chamber of the bellow 80e (the exit regions of the orifice) is to have both regions at atmospheric pressure. Of course other methods to adjust the pressure to calibrate the flow can be employed; however, a simple reliable model is to vent both chamber areas to atmospheric pressure so the flow can be solely calibrated upon the resting water level 31e within the interior chamber 41e and the cross-sectional area flow control orifice 44e (see FIG. 11).

It should further be noted that in the various embodiments disclosed herein, a mean temperature viscosity of the water passing through the flow control orifice is preferably used. In other words, depending upon the region of the installation, a desirable temperature that would occur during a heavy downpour time of year should be used to calculate the viscosity for the proper fluid flow rate given the head pressure of the control type and the orifice size.

The operation of the embodiment as shown in FIGS. 9–12 is of a similar operation as described in the various embodiments above. FIG. 10 shows an extreme flow situation where the water level 33e is very high within the pond in the control structure 28e. In this scenario not only is there flow through the flow control module 22e down along the water receiving component 24e, but further there is flow through the first and second fluid passages 86e and 88e. FIG. 9 shows a minimal flow or no flow situation where the water level 35e is at a lower level and just at a drainage point over the upper initial crust portion of the drainage line 95e. Absent evaporation issues or additional fluid passageways to empty the control container 28e, this would be the lowest level where at this point, the flow is actually controlled by the water level height 35e with respect to the lowest portion of the drainage line 95e in communication with the water level. However, as the appreciable amount of flow enters the control container 28e by the passageway (not shown) from the adjacent pond, the flow would be controlled by the flow control system 21e.

Figure 12:
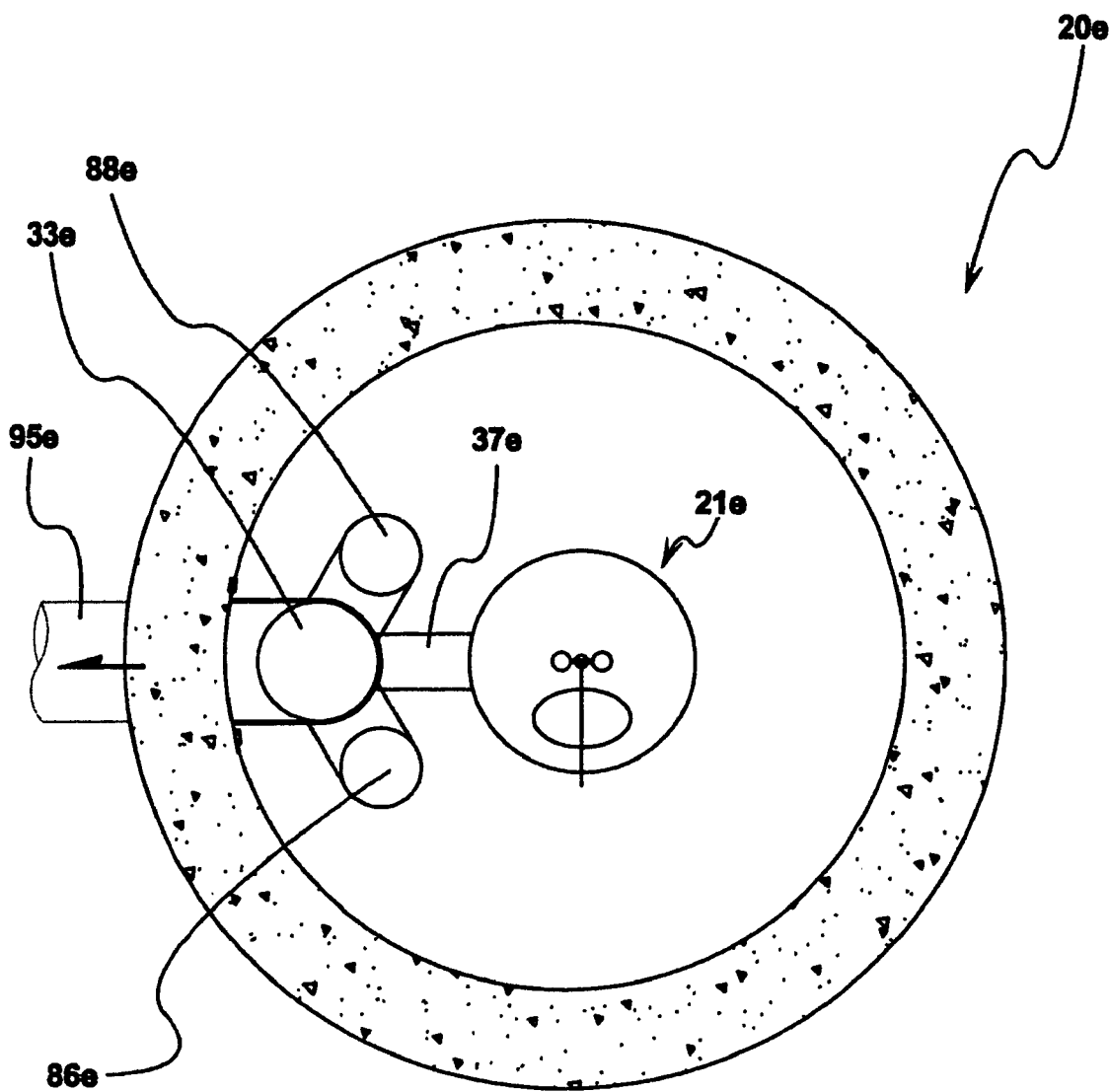
FIG. 12 is a cross-sectional view taken at line 12—12 of FIG. 9 showing the flow control system as well as the fluid receptacle and first and second fluid passages adapted to receive fluid in very heavy downpours.

FIG. 12 shows a partial cross-sectional top view of the flow control assembly 20e taken at line 12—12 of FIG. 9. As can be seen in this figure, the fluid passages 86e and 80e can be positioned at various angles with respect to the center axis of the flow receptacle 33e. The passage 37e should be of a sufficient strength to support the flow control system 21e in the event the water level is drained or evaporated or otherwise below that as shown in FIG. 9 whereby the entire weight of the flow control system 21e is cantilevered thereon.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. A flow control system adapted to operate within a control structure adjacent to a pond having a water level, the flow control system comprising:
   a) a flow control module having a buoyant portion and an intake portion, a surface defining an interior chamber region and an orifice of a known cross section, positioned at a known depth from a mean water level line within the interior chamber, where the mean water level line corresponds to the height of the water level of the pond,
   b) a water receiving component comprising vertical displacement system adapted to reposition the flow control module, the water receiving component being in communication with the flow control module where the water receiving component provides an interior passageway that is in communication with the orifice of the flow control module where the flow control module is adapted to allow a predetermined flow rate of water through the orifice when the water level within the control structure is at a low level or at a high level.

2. The flow control system as recited in claim 1 whereby a filter system is positioned at the intake portion to prevent large particulate matter from passing therethrough.

3. The flow control system as recited in claim 1 whereby an interior passageway is provided that is in communication with the interior chamber region of the flow control module and the surrounding atmosphere.

4. The flow control system as recited in claim 1 where the flow control module has a vent that is in communication with the surrounding atmosphere.

5. The flow control system as recited in claim 3 where the flow control module has a vent that is in communication with the surrounding atmosphere.

6. The flow control system as recited in claim 1 whereby the vertical displacement system comprises a bellow unit sealingly connected to the flow control module and is adapted to reposition the flow control module vertically.

7. The flow control unit as recited in claim 5 where the bellow unit is adapted to collapse in a collapsed state and have the buoyant flow control module rest thereon when the water level in the control tower is at a low level.

8. The flow control unit as recited in claim 1 where the flow control module is a collapsible coil member that is adapted to be positioned in a stored state where the coil member winds in a spiral-like pattern in the lower portion of the control unit when the water level is low therein.

9. The flow control unit as recited in claim 1 whereby the predetermined flow rate is within 5% of the maximum allowable flow rate authorized by a controlling authoritative body.

10. The flow control unit as recited in claim 1 whereby the orifice is positioned a distance greater than 3 inches under the main water level line.

11. The flow control unit as recited in claim 1 whereby the pond is of a lesser net volume than a static flow control orifice because the flow control system allows for a maximum allowable drainage flow rate to drain the pond when drainage water is passed thereto.

12. The flow control unit as recited in claim 1 whereby a fluid passage is provided positioned at an upper level within the control tower to allow additional water to flow therethrough when the water level within the control tower is at a high level.

13. The flow control unit as recited in claim 12 whereby the second orifice is positioned at a sufficiently high level that the input flow rate to the pond is that of a 100-year flood.

14. The flow control unit as recited in claim 1 where a higher flow maintenance system is employed to handle an extreme flow condition where a fluid passage is provided in the upper portions of the control unit.

15. A method of draining a pond comprising the steps of:
   positioning a control unit having an interior cavity region with an opening that is in communication with water contained in the pond,
   a) positioning a flow control module within the control unit and allowing water to enter an interior chamber region of the flow control module where the flow control module is adapted to float in the water within the control unit,
   b) providing a sufficient and predetermined buoyant lift of the flow control module where the water level contained within the interior chamber region is at a prescribed height with respect to an orifice positioned in the flow control module,
   c) the orifice having a calculated cross-sectional area to allow a prescribed flow rate to pass therethrough given the known height of the water level contained within the chamber region of the flow control module,
   d) providing a communication passage that is in fluid communication with the orifice where the communication passage is at a known pressure to allow a predictable flow rate therein,
   e) whereas the prescribed flow rate through the orifice is substantially constant at various water levels within the control unit.

16. The method as recited in claim 15 whereby the orifice is positioned at a depth below the prescribed fluid height within the chamber region greater than 2.5 inches from the center of area of the orifice.

17. The method as recited in claim 15 whereby the orifice has a circular cross-section.

18. The method as recited in claim 15 whereby a second orifice is provided at an upper portion within the control unit to allow for a secondary flow passage when the water level in the control unit is high.

19. A flow control module having an entrance passage that is adapted to communicate with a fluid, where the fluid is adapted to be positioned in an interior chamber of the flow control module and an orifice is provided at a fixed position within the chamber, the flow control module being sufficiently buoyant so it is adapted to float on water at a prescribed height so the fluid within the chamber is at a prescribed fluid height when the flow control module is floating, the orifice being in communication with an output flow line where the pressure of the output flow line, the known hydrostatic pressure acting upon the water entering the orifice, and the average viscosity of the fluid allows a prescribed flow rate therethrough the orifice to the output flow line at various water level heights.

20. The flow control module as described in claim 19 whereby the various water level heights include first and second water heights comprise a lower water level height and a higher level water level height within a control unit where the flow control module is positioned therein and the flow control module is buoyantly floating at the first and second water level heights.

21. The flow control module as recited in claim 19 whereby the interior chamber is vented to the surrounding atmosphere to allow the fluid to freely enter the entrance passage.

22. The flow control module as recited in claim 19 whereby the output flow line is provided with a vent to the surrounding atmosphere so the known pressure therein is local atmospheric pressure.

23. The flow control module as recited in claim 19 whereby the unit is adapted to be positioned in a pond to drain water contained therein the pond.

24. The flow control module as recited in claim 23 whereby the prescribed flow rate to the orifice is a flow rate within 10% of the maximum allowable flow rate prescribed by a controlling authoritative entity to allow for quicker drainage of the pond when the water level of the pond is low.

25. A flow control module having an entrance passage that is adapted to communicate with a fluid, where the fluid is in communication with a body of water, an orifice is provided in fluid communication with the entrance passage, where the orifice size and height of the water acting thereon provides a hydrostatic pressure acting upon the orifice to allow a prescribed fluid flow rate to flow therethrough at a substantially similar rate at a first water level height and second water level height that is higher than the first water level of the body of water.

26. The flow control module as recited in claim 25 where the orifice is at a fixed position within a chamber and the flow control system being sufficiently buoyant so it is adapted to float on water at a prescribed height so the fluid within the chamber is at a prescribed fluid height when the flow control module is floating.

27. The flow control module as recited in claim 25 where the orifice is at a fixed height and the orifice cross-sectional size is adapted to change in area by a flow control valve where as the water level increases the hydrostatic pressure is adapted to decrease the cross-sectional size of the orifice whereby causing substantially similar fluid flow rates therethrough at a first water level height and a second water level height.

* * * * *